(12) United States Patent
Matsuda (10) Patent No.: US 11,084,376 B2
(45) Date of Patent: Aug. 10, 2021

(54) CONTROL APPARATUS OF STRADDLE VEHICLE

(71) Applicant: KAWASAKI JUKOGYO KABUSHIKI KAISHA, Kobe (JP)

(72) Inventor: Yoshimoto Matsuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 54 days.

(21) Appl. No.: 16/615,197

(22) PCT Filed: Mar. 7, 2018

(86) PCT No.: PCT/JP2018/008784
§ 371 (c)(1),
(2) Date: Nov. 20, 2019

(87) PCT Pub. No.: WO2018/216308
PCT Pub. Date: Nov. 29, 2018

(65) Prior Publication Data
US 2020/0171946 A1 Jun. 4, 2020

(30) Foreign Application Priority Data
May 24, 2017 (JP) .............................. JP2017-102688

(51) Int. Cl.
*B60K 31/00* (2006.01)
*B62J 45/41* (2020.01)
(Continued)

(52) U.S. Cl.
CPC .......... *B60K 31/0066* (2013.01); *B62J 45/20* (2020.02); *B62J 45/412* (2020.02); *B62J 45/4151* (2020.02); *B60K 2031/0091* (2013.01)

(58) Field of Classification Search
CPC ........ B60K 2031/0091; B60K 31/0066; B60T 8/1755; B60W 30/12; B60W 30/16;
(Continued)

(56) References Cited

U.S. PATENT DOCUMENTS 10,852,315 B2 * 12/2020 Azuma ..................... G01P 3/66
2008/0046159 A1   2/2008 Baijens et al.
(Continued)

FOREIGN PATENT DOCUMENTS

DE    102014205070 A1   9/2015
DE    112015003610 T5   5/2017
(Continued)

*Primary Examiner* — Tyler J Lee
(74) *Attorney, Agent, or Firm* — Alleman Hall Creasman & Tuttle LLP (57) ABSTRACT

A control apparatus of a straddle vehicle includes: a prediction section that determines whether a rider of the straddle vehicle intends to turn the straddle vehicle and predicts whether turning of the straddle vehicle will occur, based on information related to at least one of a predetermined behavior exhibited by a vehicle body of the straddle vehicle before turning and a predetermined driving operation performed by the rider; and a vehicle control section that provides driving assistance during turning of the straddle vehicle based on a result of the prediction made by the prediction section.

10 Claims, 3 Drawing Sheets

(51) Int. Cl.
*B62J 45/20* (2020.01)
*B62J 45/412* (2020.01)
*B62J 45/415* (2020.01)

(58) Field of Classification Search
CPC ........ B60W 40/08; B62J 45/20; B62J 45/412; B62J 45/4151; B62J 99/00
See application file for complete search history.

(56) References Cited

U.S. PATENT DOCUMENTS

| | | | |
|---|---|---|---|
| 2008/0112174 A1* | 5/2008 | Nakano | B62J 6/02 362/466 |
| 2008/0178840 A1 | 7/2008 | Oshima et al. | |
| 2009/0326779 A1* | 12/2009 | Oshima | B60W 50/082 701/86 |
| 2010/0168958 A1* | 7/2010 | Baino | B60Q 1/12 701/36 |
| 2012/0067122 A1* | 3/2012 | Sakamoto | B60W 40/103 73/493 |
| 2012/0259479 A1* | 10/2012 | Yoneta | G07C 5/08 701/1 |
| 2013/0041522 A1* | 2/2013 | Mori | G07C 5/0808 701/1 |
| 2013/0241413 A1* | 9/2013 | Ooba | B60Q 1/18 315/82 |
| 2014/0129087 A1* | 5/2014 | Takenaka | B62K 21/00 701/41 |
| 2015/0061312 A1 | 3/2015 | Ishige | |
| 2015/0112569 A1* | 4/2015 | Yamane | B60W 30/18145 701/72 |
| 2016/0090037 A1* | 3/2016 | Tetsuka | B60W 50/16 340/435 |
| 2016/0236679 A1 | 8/2016 | Inoue et al. | |
| 2017/0028971 A1* | 2/2017 | Kajiyama | B60W 30/08 |
| 2017/0089699 A1 | 3/2017 | Azuma et al. | |
| 2017/0089939 A1 | 3/2017 | Azuma et al. | |
| 2017/0101147 A1* | 4/2017 | Hasegawa | B62J 6/04 |
| 2017/0144665 A1 | 5/2017 | Ohashi et al. | |
| 2018/0273089 A1* | 9/2018 | Isomoto | G05D 1/0212 |
| 2019/0135248 A1* | 5/2019 | Iizuka | B60T 8/17555 |

FOREIGN PATENT DOCUMENTS

| | | |
|---|---|---|
| EP | 1679673 A1 | 7/2006 |
| EP | 3335953 A1 | 6/2018 |
| EP | 3335954 A1 | 6/2018 |
| EP | 3335955 A1 | 6/2018 |
| IT | TO20100454 T1 | 11/2011 |
| JP | 2002326525 A | 11/2002 |
| JP | 2004136800 A | 5/2004 |
| JP | 2006096319 A | 4/2006 |
| JP | 2007531654 A | 11/2007 |
| JP | 2008184950 A | 8/2008 |
| JP | 2011046294 A | 3/2011 |
| JP | 2011201539 A | 10/2011 |
| JP | 2013086580 A | 5/2013 |
| JP | 2014203235 A | 10/2014 |
| JP | 2015022420 A | 2/2015 |
| JP | 2016068769 A | 5/2016 |
| JP | 2016119247 A | 6/2016 |
| JP | 2016150683 A | 8/2016 |
| JP | 2017065560 A | 4/2017 |
| WO | 2017030131 A1 | 2/2017 |

* cited by examiner

CONTROL APPARATUS OF STRADDLE VEHICLE

TECHNICAL FIELD

The present invention relates to a control apparatus of a straddle vehicle.

BACKGROUND ART

Some straddle vehicles such as motorcycles have the function of assisting the rider in driving operations by controlling, for example, the vehicle speed (see Patent Literature 1, for example).

CITATION LIST

Patent Literature

Patent Literature 1: Japanese Laid-Open Patent Application Publication No. 2008-184950

SUMMARY OF INVENTION

Technical Problem

When a straddle vehicle such as a motorcycle makes a turn, the vehicle body of the straddle vehicle is inclined. It is desired for such a straddle vehicle to offer improved operation feeling during turning. In the case where the state of turning of the vehicle is detected and then the driving assistance is changed according to the state of turning of the vehicle, there is a time delay before the changed driving assistance is provided, and this time delay deteriorates the operation feeling experienced by the rider.

It is therefore an object of the present invention to prevent delayed provision of driving assistance to a rider of a vehicle when the vehicle is traveling with its vehicle body inclined and improve the operation feeling experienced by the rider.

Solution to Problem

A control apparatus of a straddle vehicle according to an aspect of the present invention includes: a prediction section that determines whether a rider of the straddle vehicle intends to turn the straddle vehicle and predicts whether turning of the straddle vehicle will occur, based on information related to at least one of a predetermined behavior exhibited by a vehicle body of the straddle vehicle before turning and a predetermined driving operation performed by the rider; and a vehicle control section that provides driving assistance during turning of the straddle vehicle based on a result of the prediction made by the prediction section.

With the above configuration, since the driving assistance is provided in anticipation of the intention of the rider to turn the vehicle, early provision of the assistance can be achieved. This makes it possible to prevent delayed provision of driving assistance when the vehicle is traveling with its vehicle body inclined and improve the operation feeling experienced by the rider.

Before turning of the vehicle, the prediction section may determine whether the rider intends to turn the straddle vehicle based on information including at least one of a change in bank angle of the vehicle body, a shift in posture of the rider, and a change in rotation angle of the vehicle body in a roll direction.

With this configuration, since whether the rider intends to turn the vehicle is determined based on the behavior of the vehicle body or the rider, the determination can be made early before the actual occurrence of turning of the vehicle. For example, whether the rider intends to turn the vehicle may be determined by detecting a small change in yaw, roll, or pitch rate which is caused by weight shift of the rider.

The prediction section may determine whether the rider intends to turn the straddle vehicle based on information including a change over time in the amount of the predetermined driving operation performed by the rider.

With this configuration, since whether the rider intends to turn the vehicle is determined based on the change over time in the amount of the driving operation performed by the rider (e.g., the amount of accelerator operation, brake operation, or steering operation), the determination can be made early before the actual occurrence of turning of the vehicle. Whether the rider intends to turn the vehicle may be determined based on a change over time in the torque of the prime mover of the vehicle.

The control apparatus may further include a skill setting section in which driving skill of the rider is set, and the vehicle control section may adjust the driving assistance according to the driving skill set in the skill setting section.

With this configuration, for example, when the rider has a high driving skill, the convenience for the rider can be increased by decreasing the amount of the driving assistance.

The control apparatus may further include a target detection section that detects a target object located ahead of the straddle vehicle, and the vehicle control section may provide the driving assistance based on the turning predicted by the prediction section and a result of detection made by the target detection section.

With this configuration, driving assistance taking into account a target object (such as a preceding vehicle) located in a direction in which the straddle vehicle will turn (examples of such driving assistance include collision avoidance, collision mitigation, collision warning, and preceding vehicle follow-up) can be provided before the actual occurrence of turning of the vehicle.

The vehicle control section may make a change in the driving assistance when a signal coming from the target object detection section changes from a state indicating detection of the target object to a state indicating non-detection of the target object and it is determined that the straddle vehicle is banked or it is predicted that turning of the straddle vehicle will occur.

With this configuration, for example, in the case where the signal coming from the target object detection section changes into the state indicating non-detection because of banking of the vehicle body despite the presence of the target object ahead of the vehicle, the driving assistance can be appropriately adapted to the changed situation by making a change in the driving assistance (e.g., by temporarily reducing the amount of the driving assistance).

When making a change in the driving assistance, the vehicle control section may change the mode of indication given by an indicator provided for the driving assistance.

With this configuration, the rider can visually perceive the temporary reduction in the amount of the driving assistance and take advantage of this information in his/her driving operations.

The control apparatus may further include a travel lane recognition section that recognizes a travel lane, and the vehicle control section may control the speed of the straddle vehicle based on the turning predicted by the prediction section to prevent the straddle vehicle from straying from the travel lane recognized by the travel lane recognition section.

With this configuration, vehicle speed control (such as prime mover control or brake control) can be performed in consideration of turning of the vehicle before the actual occurrence of turning of the vehicle, and thus straying from the travel lane can be smoothly predicted and prevented.

The vehicle control section may control the speed of the straddle vehicle based on a value detected by a vehicle speed sensor that detects the speed of the straddle vehicle from a wheel rotational speed, and upon increase in bank angle of the vehicle body, the vehicle control section may make a correction by decreasing the detected value of the speed of the straddle vehicle or by increasing a command value of drive power.

With this configuration, when the vehicle speed value detected by the vehicle speed sensor is higher than an actual vehicle speed because of a decrease in the radius of tire contact area during banking of the vehicle body, a correction can be made by decreasing the detected vehicle speed value toward the actual vehicle speed or increasing the command value of the drive power of the prime mover so as to compensate for a decrease in the command value caused due to the detected vehicle speed value being higher than the actual vehicle speed. This enables appropriate vehicle speed control during a banked turn.

Advantageous Effects of Invention

The present invention makes it possible to prevent delayed provision of driving assistance to a rider of a vehicle when the vehicle is traveling with its vehicle body inclined and improve the operation feeling experienced by the rider.

BRIEF DESCRIPTION OF DRAWINGS

FIGS. 3A and 3B are diagrams illustrating a radar detection region, where

DESCRIPTION OF EMBODIMENTS

Hereinafter, an embodiment will be described with reference to the drawings.

Figure 1:
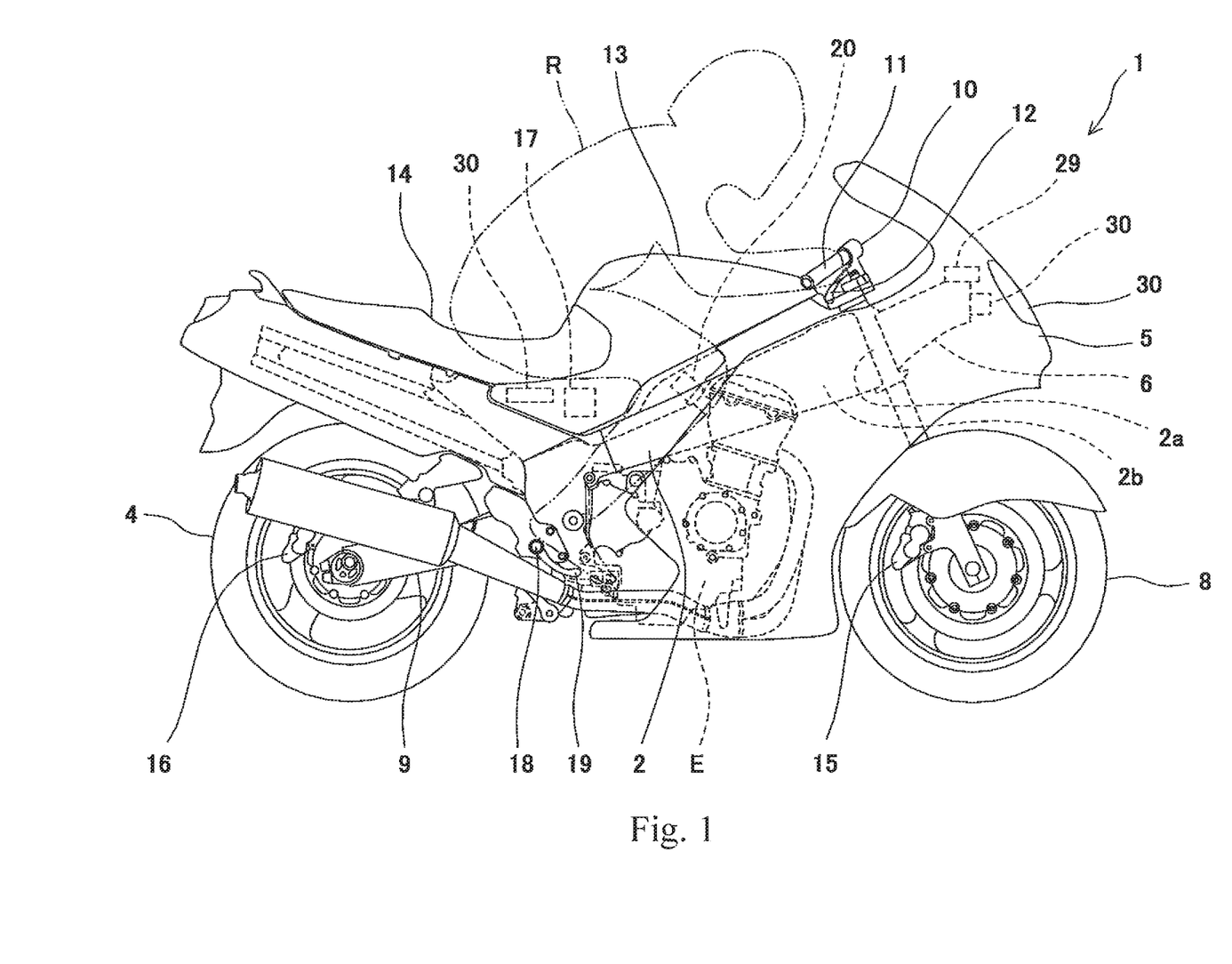
FIG. 1 is a side view showing major components of a motorcycle according to an embodiment.

FIG. 1 is a side view showing major components of a motorcycle according to an embodiment. As shown in FIG. 1, the motorcycle 1 is an example of a straddle vehicle capable of traveling with its vehicle body 2 banked (inclined) in a leftward/rightward direction. The motorcycle 1 includes a front wheel 3 as a driven wheel and a rear wheel 4 as a drive wheel. The vehicle body 2 includes a head pipe portion 2a rotatably supporting a steering shaft (not illustrated) for steering of the front wheel 3 and a frame portion 2b extending rearwardly from the head portion 2a. An engine E is mounted on the frame portion 2b. A front end of a swing arm 9 is pivotally supported by a rear of the frame portion 2b, and the rear wheel 4 is rotatably supported by a rear end of the swing arm 9. The power output from the engine E is transmitted to the rear wheel 4 via a power transmission member (e.g., a chain or a belt).

A front cowl 5 covering the front and sides of the head pipe portion 2a is supported by the vehicle body 2 via a bracket 6. The bracket 6 is secured to the head pipe portion 2a and connected to the front cowl 5 and a meter display device (not illustrated). The front cowl 5 has a transmissive portion 5a that allows laser beams and light to pass therethrough. A laser sensor 29 and a forward imaging camera 30 are attached to the bracket 6. The laser sensor 29 emits a laser beam forward of the motorcycle 1 through the transmissive portion 5a, and the forward imaging camera 30 captures images of the environment ahead of the motorcycle 1 through the transmissive portion 5a.

A bar-shaped handle 10 extending in the leftward/rightward direction is connected to the steering shaft (not illustrated) supported by the head pipe portion 2a. An acceleration operation member 11 (e.g., an accelerator grip) to which an acceleration command is input from the rider R is provided on a right-side portion of the handle 10. A braking operation member 12 (e.g., a brake lever) to which a braking command is input from the rider R is provided forwardly of the acceleration operation member 11. A fuel tank 13 is provided rearwardly of the handle 10, and a seat 14 on which the rider sits is provided rearwardly of the fuel tank 13.

A front wheel brake 15 is attached to the front wheel 3. A rear wheel brake 16 is attached to the rear wheel 4. The front wheel brake 15 and rear wheel brake 16 are, for example, of the hydraulic pressure type. A brake control unit 44 that controls braking forces to be generated by the front wheel brake 15 and rear wheel brake 16 is installed in the vehicle body 2. Step members 18 on which the rider places his/her feet are provided below, and on both sides of, the seat 14. A braking operation member 19 (e.g., a brake pedal) to which a braking command is input from the rider R is provided on one of the step members 18. Upon operation of the braking operation member 12, mainly the front wheel brake 15 works. Upon operation of the braking operation member 19, mainly the rear wheel brake 16 works.

An electronically controlled throttle device 41 is provided on an air-intake passage communicating with an air-intake port of the engine E. The electronically controlled throttle device 41 includes a throttle valve (not illustrated) disposed on the air-intake passage, and the position of the throttle valve is electronically controlled as a function of the amount of operation of the acceleration operation member 11. On the air-intake passage is provided a fuel injector 43 (see FIG. 2) that injects fuel delivered from the fuel tank 13 into the air-intake passage. The engine E includes an ignition plug 42 (see FIG. 2) that ignites air-fuel mixture present in the combustion chamber. A control apparatus 50 is installed in the vehicle body 2.

Figure 2:
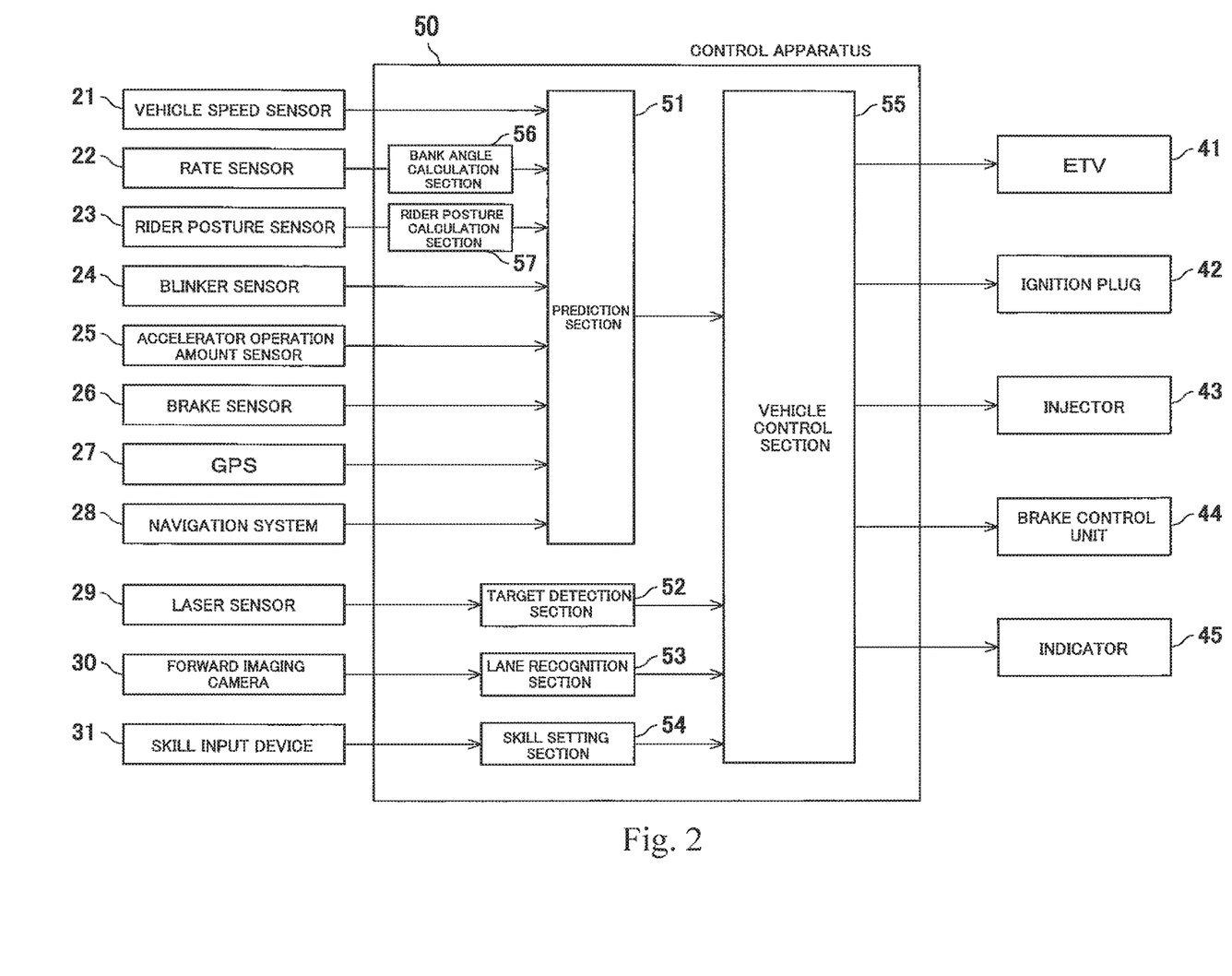
FIG. 2 is a block diagram of a control apparatus of the motorcycle shown in FIG. 1.

FIG. 2 is a block diagram of the control apparatus 50 of the motorcycle 1 shown in FIG. 1. As shown in FIG. 2, the electronically controlled throttle device 41, the ignition plug 42, the fuel injector 43, the brake control unit 44, and an indicator 45 are connected to the output of the control apparatus 50. That is, the control apparatus 50 controls acceleration/deceleration of the motorcycle 1 and controls the mode of indication given by the indicator 45 (the mode includes an illuminated mode, an unilluminated mode, and a blinking mode, for example). The indicator 45 is located to be viewable by the rider R. For example, the indicator 45 is provided in the meter device.

To the input of the control apparatus 50 there are connected a vehicle speed sensor 21, a rate sensor 22, a rider posture sensor 23, a blinker sensor 24, an accelerator operation amount sensor 25, a brake sensor 26, a GPS 27, a car navigation system 28, the laser sensor 29, the forward imaging camera 30, and a skill input device 31. The vehicle speed sensor 21 detects the travel speed of the motorcycle 1, such as in particular the rotational speed of the front wheel 3 (driven wheel). The rate sensor 22 detects the rate of change of the angular displacement of the vehicle body in the yaw, roll, or pitch direction. The rate sensor 22 is configured to determine the angular displacement of the vehicle body by calculating the integral of the detected rate of change of the angular displacement.

The rider posture sensor 23 detects the amount of weight shift of the rider R sitting on the seat 14. For example, a load sensor provided in the seat 14 or step member 18 or a steering torque sensor may be used as the rider posture sensor 23. The rate sensor 22 may serve as the rider posture sensor 23 to determine the change in posture of the rider from the rate of change of the angular displacement in the yaw, roll, or pitch direction.

When the rider R turns on the blinker (causes the blinker to blink), the blinker sensor 24 detects the turning on of the blinker. The accelerator operation amount sensor 25 detects the amount of operation of the acceleration operation member 11; namely, the accelerator operation amount sensor 25 detects the acceleration demanded by the rider R. The brake sensor 26 detects brake operation performed by the rider R or detects generation of brake pressure, thereby detecting the occurrence of a braking event. The GPS 27 is a known global positioning system that detects the current location of the motorcycle 1. The car navigation system 28 gives the rider guidance on the route from the current location of the motorcycle 1 to a destination.

The laser sensor 29 emits a laser beam forward of the motorcycle 1 and receives the reflected wave to detect the distance between the motorcycle 1 and an object (target object) located ahead of the motorcycle 1. Instead of the laser sensor 29, a millimeter-wave radar or a camera may be used to determine the distance to the object located ahead of the motorcycle. The forward imaging camera 30 captures images of the environment ahead of the motorcycle 1 to allow recognition of the condition of the road ahead of the motorcycle 1 (e.g., recognition of the travel lane). The skill input device 31 is intended to allow the rider R to input the level of his/her driving skill (e.g., beginner level, intermediate level, or advanced level).

Software components of the control apparatus 50 include a bank angle calculation section 56, a rider posture calculation section 57, a prediction section 51, a target detection section 52, a travel lane recognition section 53, a skill setting section 54, and a vehicle control section 55. Hardware components of the control apparatus 50 include a processor, a volatile memory, a non-volatile memory, and an I/O interface. The prediction section 51, target detection section 52, lane recognition section 53, skill setting section 54, and vehicle control section 55 are implemented by processing operations performed by the processor using the volatile memory according to a program stored in the non-volatile memory. The control apparatus 50 may be constituted by a plurality of separate control units or may be configured as a single unit.

The bank angle calculation section 56 calculates the integral of the angular displacement change rate detected by the rate sensor 22 for the roll direction of the motorcycle to determine the inclination angle (bank angle) of the vehicle body in the leftward/rightward direction. The rider posture calculation section 57 determines the posture of the rider from the amount of the rider R's weight shift detected by the rider posture sensor 23.

If the vehicle speed sensor 21 detects that the vehicle is traveling, the prediction section 51 determines whether the rider R intends to turn the vehicle and predicts whether turning of the vehicle will occur, before the vehicle actually makes a turn. The prediction section 51 makes the determination and prediction based on information related to a predetermined behavior exhibited by the vehicle body 2 before turning and a predetermined driving operation performed by the rider R. If the bank angle determined by the bank angle calculation section 56 or the rate of change of the bank angle exceeds a predetermined threshold before turning of the vehicle and/or if the rider posture sensor 23 detects a change in posture of the rider in the leftward/rightward direction, in the forward/rearward direction, and/or in the upward/downward direction before turning of the vehicle, the prediction section 51 determines that the rider R intends to turn the vehicle. The threshold may be varied according to the vehicle speed. For example, the threshold may be increased with increasing vehicle speed so that the sensitivity of turning intention determination is increased during high-speed travel.

The prediction section 51 determines whether the rider intends to turn the vehicle based on information including a change over time in the amount of accelerator operation performed by the rider. The amount of accelerator operation is detected by the accelerator operation amount sensor 25. For example, if, before turning of the vehicle, the amount of accelerator operation decreases (deceleration operation is performed) in a state where an increase in bank angle and/or a change in posture of the rider has been detected, the prediction section 51 determines that the rider R intends to turn the vehicle and predicts the occurrence of turning of the vehicle. The prediction section 51 may determine that the turning is about to be completed if the amount of accelerator operation increases (the vehicle is accelerated) when the bank angle has exceeded a predetermined angle (bank state).

The prediction section 51 determines whether the rider intends to turn the vehicle based on information indicating braking event occurrence detected by the brake sensor 26. For example, if, before turning of the vehicle, a braking event occurs in a state where an increase in bank angle and/or a change in posture of the rider has been detected, the prediction section 51 determines that the rider R intends to turn the vehicle and predicts the occurrence of turning of the vehicle.

The prediction section 51 determines that the rider R intends to turn the vehicle and predicts the occurrence of turning of the vehicle also when it is determined, based on map information, that the motorcycle 1's current location detected by the GPS 27 is coming closer to a curve. When the car navigation system 28 gives guidance instructing the rider R to make a turn (e.g., guidance instructing the rider to turn to the right or left), the prediction section 51 determines that the rider R intends to turn the vehicle.

The target detection section 52 detects the distance between the motorcycle 1 and an object (target object) located ahead of the motorcycle 1 based on information obtained through the laser sensor 29 or any other sensor (e.g., a millimeter-wave radar or a camera). The lane recognition section 53 uses a known image recognition technology to recognize travel lane-dividing lines ahead of the motorcycle 1 from an image captured by the forward imaging camera 30, thereby recognizing the travel lane. In the skill setting section 54, the driving skill level input by the rider R through the skill input device 31 is set as the skill level of the rider R.

During turning of the vehicle, the vehicle control section 55 provides driving assistance based on the result of the prediction made by the prediction section 51. Examples of the driving assistance include preceding vehicle follow-up control, collision avoidance control, and cruise control.

In the preceding vehicle follow-up control, the vehicle control section 55 controls the vehicle speed of the motorcycle 1 so that the inter-vehicle distance between a preceding vehicle and the motorcycle 1, which is detected by the target detection section 52, is maintained at a preset distance. Specifically, when the inter-vehicle distance is smaller than the preset distance, the vehicle control section 55 controls at least one of the electronically controlled throttle device 41, the ignition plug 42, and the fuel injector 43 to decrease the output of the engine E. When the inter-vehicle distance is greater than the preset distance, the vehicle control section 55 controls the electronically controlled throttle device 41, the ignition plug 42, and the fuel injector 43 to increase the output of the engine E and/or controls the brake control unit 44 to cause at least one of the front and rear wheel brakes 15 and 16 to brake the corresponding wheel. When the vehicle control section 55 controls the brake control unit 44, a pulsed brake signal may be provided to cause the brakes 15 and 16 to perform intermittent braking.

Figure 3A:
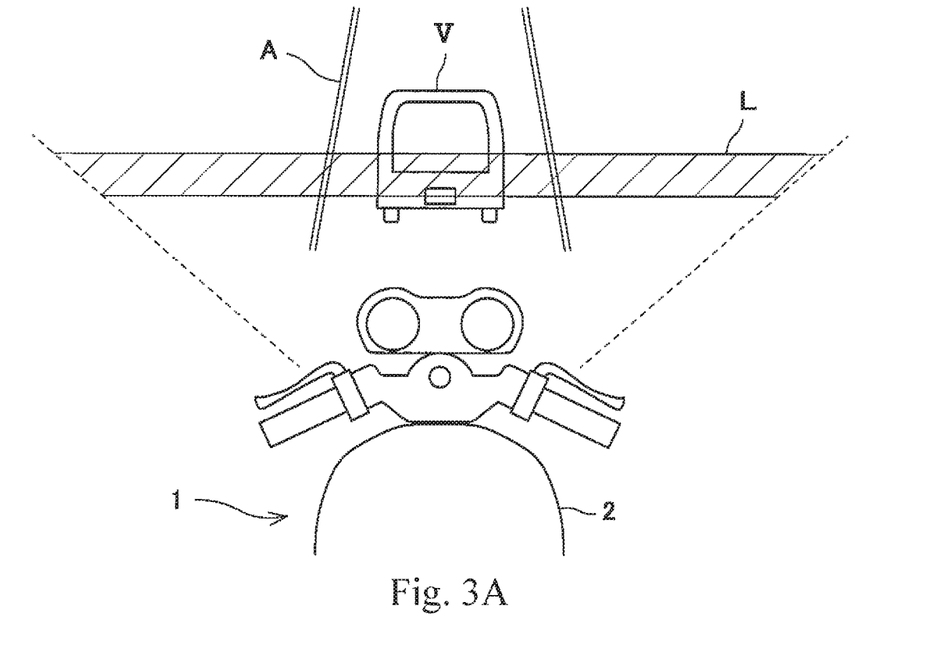
FIG. 3A shows the radar detection region in a situation where the motorcycle shown in FIG. 1 is traveling in an upright position and FIG. 3B shows the radar detection region in a situation where the motorcycle is making a banked turn.
Figure 3B:
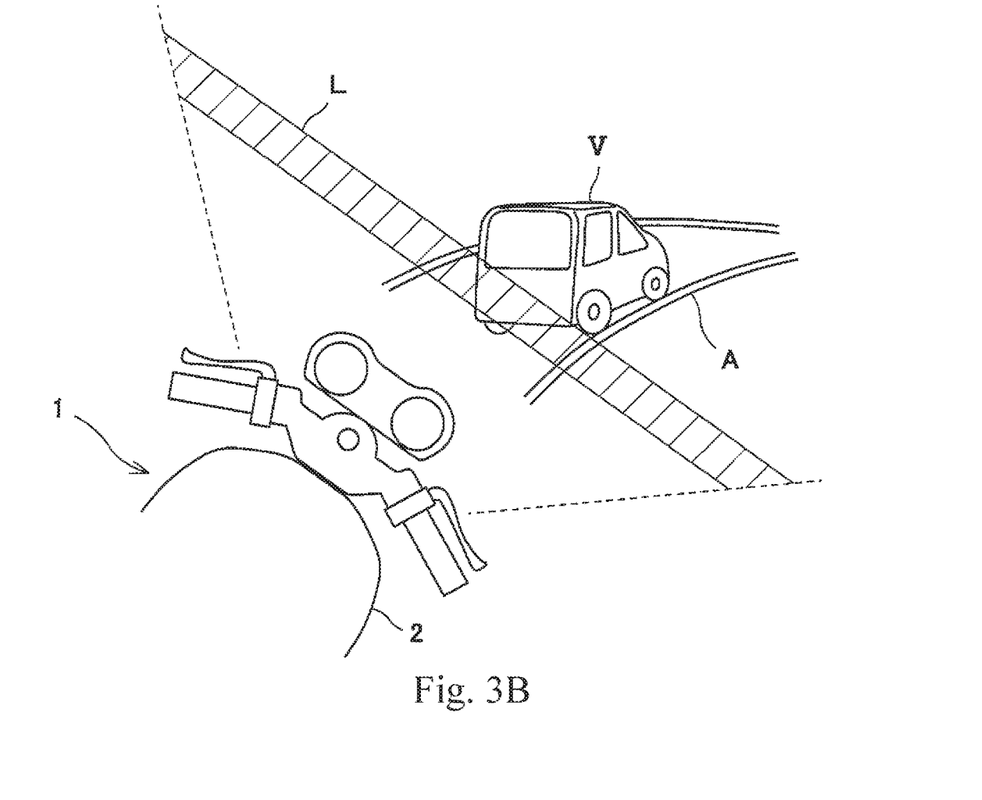

FIG. 3A shows a situation where both the motorcycle 1 and a preceding vehicle V are traveling straight and where the preceding vehicle V lies within a laser detection region L of the laser sensor 29. When, as shown in FIG. 3B, the preceding vehicle is traveling along a curve and the motorcycle 1 starts to enter the curve with its vehicle body 2 banked, the preceding vehicle V is moved relative to the motorcycle 1 in the turning direction and the laser detection region L is inclined. This deteriorates the accuracy of the detection of the preceding vehicle V by the laser sensor 29. Thus, once the prediction section 51 determines, during preceding vehicle follow-up control, that the rider R intends to turn the vehicle, the vehicle control section 55 corrects the information detected by the target detection section 52 or varies control parameters for the driving assistance.

Upon determination that there is an intention to turn the vehicle, the vehicle control section 55 may, for example, make a correction by increasing the preset distance. If the inter-vehicle distance detected by the target detection section 52 abruptly increases at a rate higher than a predetermined rate (i.e., if the preceding vehicle V ceases to be detected) while it has been determined that there is an intention to turn the vehicle, the vehicle control section 55 may make a correction by fixing the inter-vehicle distance at a value detected immediately before the abrupt increase. If the inter-vehicle distance detected by the target detection section 52 abruptly increases at a rate higher than a predetermined rate (i.e., if the preceding vehicle V ceases to be detected) while it has been determined that the bank angle calculated by the bank angle calculation section 56 is larger than a predetermined threshold, the vehicle control section 55 may make a correction by fixing the inter-vehicle distance at a value detected immediately before the abrupt increase. Upon determination that there is an intention to turn the vehicle, the vehicle control section 55 may temporarily stop the preceding vehicle follow-up control until it is determined that the turning has been completed (e.g., until it is determined that the bank angle has returned to zero).

Additionally, the vehicle control section 55 controls the vehicle speed based on the vehicle turning predicted by the prediction section 51 to prevent the motorcycle from straying from the travel lane A recognized by the lane recognition section 53. For example, once the prediction section 51 determines that the rider R intends to turn the vehicle, the vehicle control section 55 takes into consideration the current vehicle state (e.g., the current vehicle speed or bank angle) and controls at least one of the electronically controlled throttle device 41, the ignition plug 42, and the fuel injector 43 to correct the output of the engine E to a certain engine output suitable for the current vehicle state.

In the collision avoidance control, the vehicle control section 55 operates to cause deceleration and braking once the inter-vehicle distance between the preceding vehicle and the motorcycle 1, which is detected by the target detection section 52, becomes smaller than a predetermined threshold distance. Specifically, when the inter-vehicle distance is smaller than the threshold distance, the vehicle control section 55 controls at least one of the electronically controlled throttle device 41, the ignition plug 42, and the fuel injector 43 to decrease the output of the engine E and controls the brake control unit 44 to cause at least one of the front and rear wheel brakes 15 and 16 to brake the corresponding wheel.

When the prediction section 51 determines, during the collision avoidance control, that the rider R intends to turn the vehicle, the vehicle control section 55 corrects the information detected by the target detection section 52 or varies the control parameters for the driving assistance. Upon determination that there is an intention to turn the vehicle, the vehicle control section 55 may, for example, make a correction by increasing the threshold distance. If the inter-vehicle distance detected by the target detection section 52 abruptly increases at a rate higher than a predetermined rate while it has been determined that there is an intention to turn the vehicle, the vehicle control section 55 may make a correction by fixing the inter-vehicle distance at a value detected immediately before the abrupt increase.

In the cruise control, the vehicle control section 55 controls the vehicle speed so that the vehicle speed detected by the vehicle speed sensor 21 is maintained at a preset speed. Specifically, when the vehicle speed is lower than the preset speed, the vehicle control section 55 controls at least one of the electronically controlled throttle device 41, the ignition plug 42, and the fuel injector 43 to increase the output of the engine E. When the vehicle speed is higher than the preset speed, the vehicle control section 55 controls the electronically controlled throttle device 41, the ignition plug 42, and the fuel injector 43 to decrease the output of the engine E and/or controls the brake control unit 44 to cause at least one of the front and rear wheel brakes 15 and 16 to brake the corresponding wheel.

When the prediction section 51 determines, during the cruise control, that the rider R intends to turn the vehicle, the vehicle control section 55 may vary the control parameters for the driving assistance. Upon determination that there is an intention to turn the vehicle, the vehicle control section 55 may, for example, make a correction by decreasing the preset speed. Upon determination that there is an intention to turn the vehicle, the vehicle control section 55 may temporarily stop the cruise control until it is determined that the turning has been completed (e.g., until it is determined that the bank angle has returned to zero).

The vehicle control section 55 makes a correction also in detection of the vehicle speed. As the bank angle calculated by the bank angle calculation section 56 increases, the ground contact area of the wheel (front wheel 3) whose rotational speed is detected by the vehicle speed sensor 21 is shifted in the leftward/rightward direction in which the vehicle body is banked, and the contact radius of the wheel (the radius of the ground contact area of the wheel) decreases. For this reason, the vehicle speed detected by the vehicle speed sensor 21 becomes higher than the actual vehicle speed as the bank angle increases. Thus, the vehicle control section 55 makes a correction by decreasing the vehicle speed detected by the vehicle speed sensor 21 with increase in the bank angle calculated by the bank angle calculation section 56. Alternatively, the vehicle control section 55 may make a correction by increasing a command value of drive power of the engine with increase in the bank angle calculated by the bank angle calculation section 56.

Additionally, when making a change in the driving assistance upon determination by the prediction section 51 that the rider R intends to turn the vehicle, the vehicle control section 55 changes the mode of indication given by the indicator 45. For example, the vehicle control section 55 changes the mode of indication given by the indicator 45 from an unilluminated mode to a blinking mode if, during execution of the driving assistance such as the preceding vehicle follow-up control, the information detected by the target detection section 52 is corrected or the control parameters for the driving assistance are varied upon determination that the rider intends to turn the vehicle.

Additionally, the vehicle control section 55 adjusts the driving assistance according to the driving skill set in the skill setting section 54 through the skill input device 31. For example, when "advanced level" is input as the driving skill in the skill setting section 54, the vehicle control section 55 may reduce the degree of change of the driving assistance, compared to when "beginner level" is input. For example, when "advanced level" is input, the vehicle control section 55 may reduce the rate of change of deceleration (change of the driving assistance), compared to when "beginner level" is input.

The present invention is not limited to the embodiment described above, and modifications, additions, or omissions may be made to the above configuration. For example, an electric motor for travel may be provided instead of or in addition to the engine E. A throttle device mechanically associated with the motion of the acceleration operation member 11 may be used instead of the electronically controlled throttle device 41. The prediction section 51 may determine whether the rider intends to turn the vehicle based on clutch operation. A sensor configured to detect the movement of the eyes of the rider or detect a positional shift of a helmet worn by the rider may be provided, and whether the rider intends to turn the vehicle may be determined based on the detection of the movement of the eyes of the rider in the leftward/rightward direction (e.g., the movement of the eyes toward a rear-view mirror) or based on the detection of the positional shift of the helmet in the leftward/rightward direction. The bank angle may be detected by a bank angle sensor rather than by the rate sensor.

REFERENCE CHARACTERS LIST

1 Motorcycle (straddle vehicle)
2 Vehicle body
21 Vehicle speed sensor
45 Indicator
50 Control apparatus
51 Prediction section
52 Target detection section
53 Lane recognition section
54 Skill setting section
55 Vehicle control section

The invention claimed is:

1. A control apparatus of a straddle vehicle, comprising:
a prediction section that determines whether a rider of the straddle vehicle intends to turn the straddle vehicle and predicts, before the straddle vehicle turns, whether turning of the straddle vehicle will occur, based on information related to at least one of a predetermined behavior exhibited by a vehicle body of the straddle vehicle before turning and a predetermined driving operation performed by the rider; and
a vehicle control section that provides driving assistance during turning of the straddle vehicle based on a result of the prediction made by the prediction section.

2. The control apparatus according to claim 1, wherein before turning of the straddle vehicle, the prediction section determines whether the rider intends to turn the straddle vehicle based on information including at least one of a change in bank angle of the vehicle body, a shift in posture of the rider, and a change in rotation angle of the vehicle body in a roll direction.

3. The control apparatus according to claim 1, wherein the prediction section determines whether the rider intends to turn the straddle vehicle based on information including a change over time in the amount of the predetermined driving operation performed by the rider.

4. The control apparatus according to claim 1, further comprising a skill setting section in which driving skill of the rider is set, wherein
the vehicle control section adjusts the driving assistance according to the driving skill set in the skill setting section.

5. The control apparatus according to claim 1, further comprising a target detection section that detects a target object located ahead of the straddle vehicle, wherein
the vehicle control section provides the driving assistance based on the turning predicted by the prediction section and a result of the detection made by the target detection section.

6. The control apparatus according to claim 5, wherein the vehicle control section makes a change in the driving assistance when a signal coming from the target object detection section changes from a state indicating detection of the target object to a state indicating non-detection of the target object and it is determined that the straddle vehicle is banked or it is predicted that turning of the straddle vehicle will occur.

7. The control apparatus according to claim 6, wherein when making a change in the driving assistance, the vehicle control section changes the mode of indication given by an indicator provided for the driving assistance.

8. The control apparatus according to claim 1, further comprising a travel lane recognition section that recognizes a travel lane, wherein
the vehicle control section controls the speed of the straddle vehicle based on the turning predicted by the prediction section to prevent the straddle vehicle from straying from the travel lane recognized by the travel lane recognition section.

9. The control apparatus according to claim 1, wherein
the vehicle control section controls the speed of the straddle vehicle based on a value detected by a vehicle speed sensor that detects the speed of the straddle vehicle from a wheel rotational speed, and
upon increase in bank angle of the vehicle body, the vehicle control section makes a correction by decreasing the detected value of the speed of the straddle vehicle or by increasing a command value of drive power.

10. The control apparatus according to claim 1, wherein the prediction section is configured to increase, with increasing vehicle speed, a sensitivity of determining that the rider intends to turn the straddle vehicle.

* * * * *